W. B. OLIVER.
LOCATING CHART DEVICE.
APPLICATION FILED MAR. 17, 1913.
1,209,878.
Patented Dec. 26, 1916.
2 SHEETS—SHEET 1.
FIG. I.
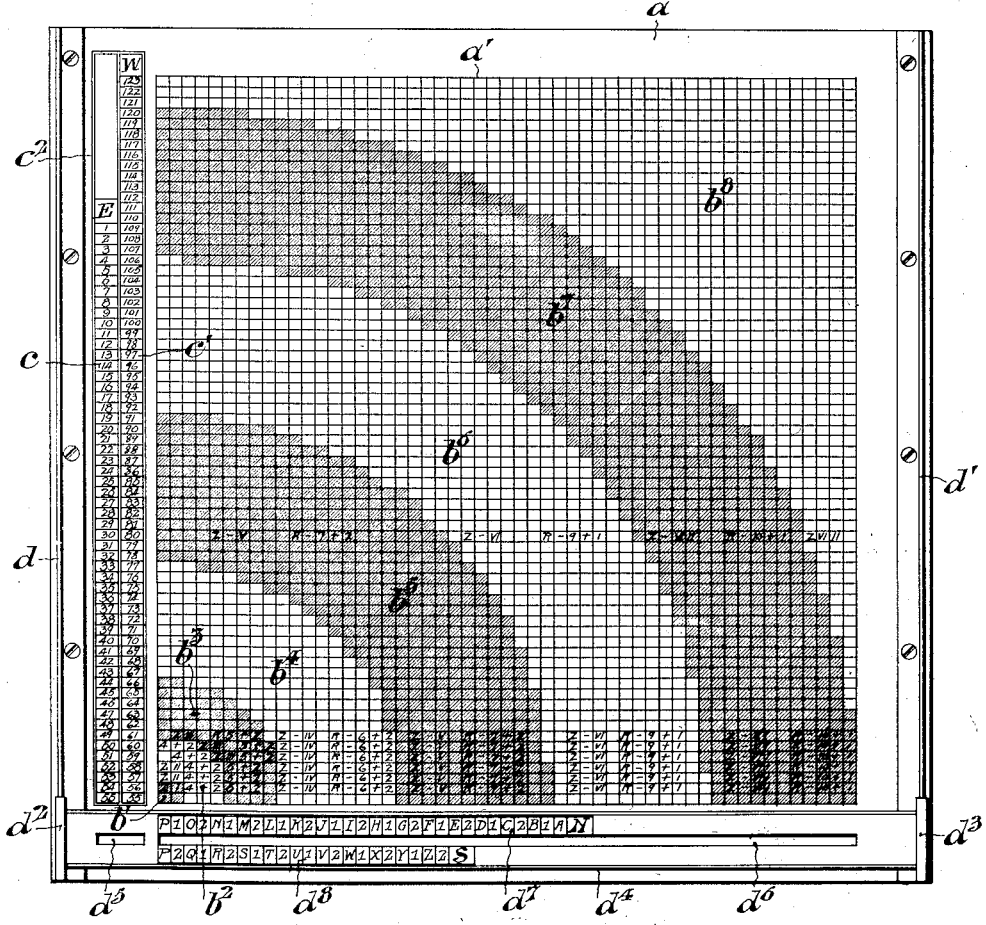
FIG. II.
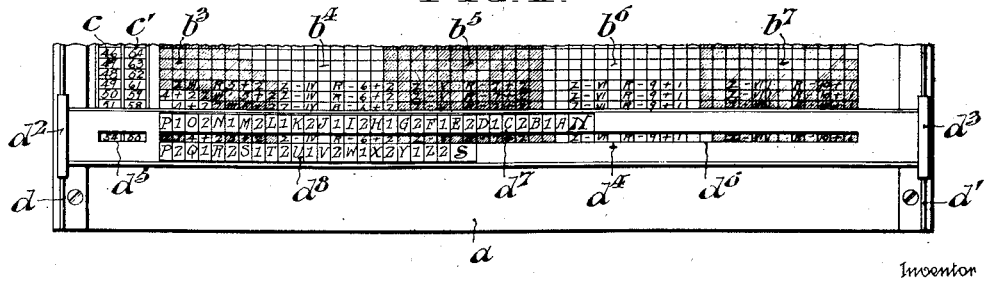
Inventor
William B. Oliver;
Witnesses

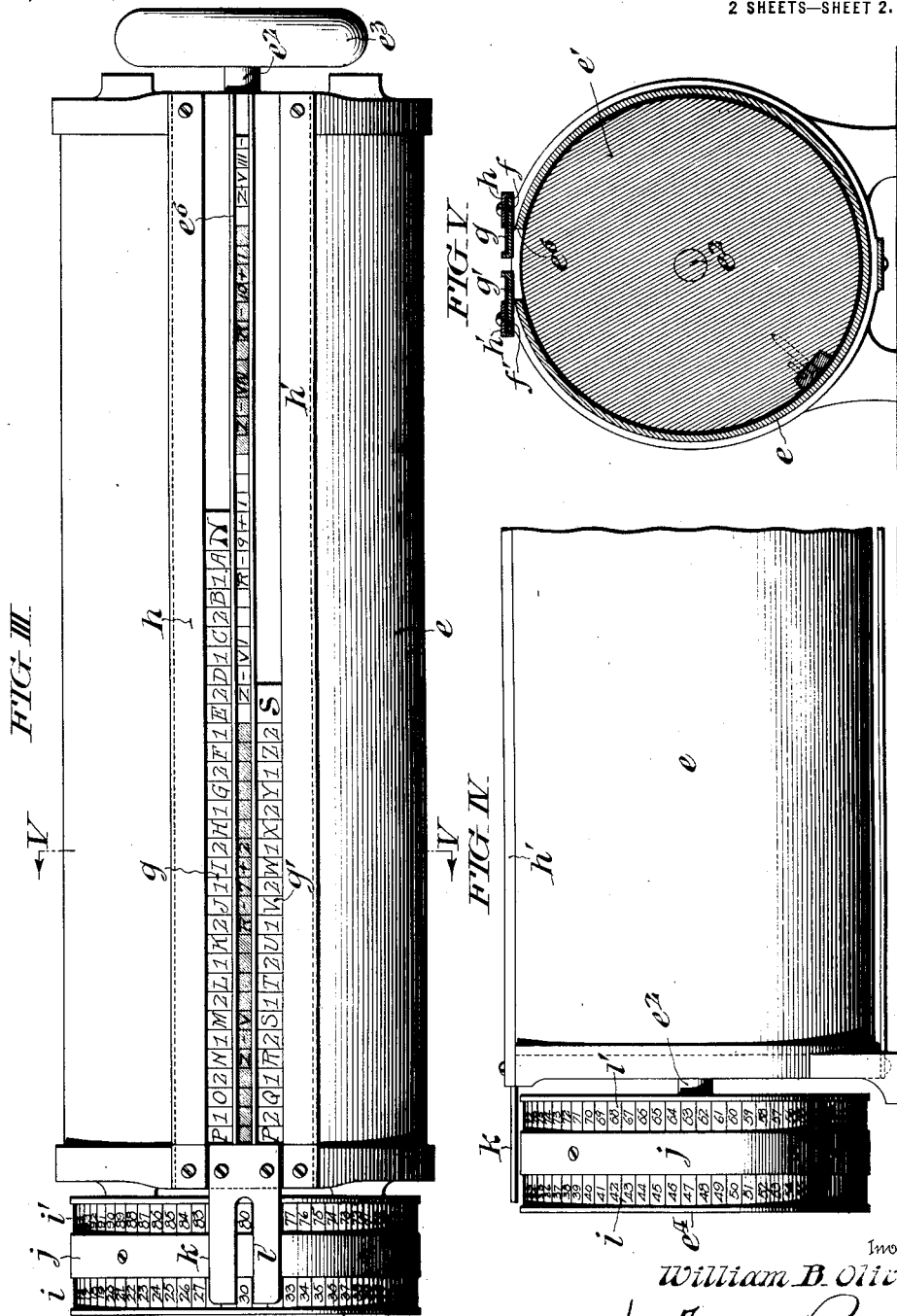

UNITED STATES PATENT OFFICE.

WILLIAM B. OLIVER, OF COLLINGSWOOD, NEW JERSEY.

LOCATING-CHART DEVICE.

1,209,878.

Specification of Letters Patent.

Patented Dec. 26, 1916.

Application filed March 17, 1913. Serial No. 754,691.

*To all whom it may concern:*

Be it known that I, WILLIAM B. OLIVER, residing at Collingswood, in the county of Camden and State of New Jersey, have invented certain new and useful Improvements in Locating-Chart Devices, whereof the following is a specification, reference being had to the accompanying drawings.

My invention relates to a device for the ready determination of the zone relation between any two stated localities within a given geographical area, having particularly in view the peculiar conditions arising from the recent act of Congress for the establishment of a system of parcel post delivery. These rates are based upon zone distances from a given point which may be for convenience termed the "home station". It will be understood, however, that my invention is applicable to any circumstances, where a similar method of ascertaining relative geographical locations is desired.

In an application heretofore filed by me under date of December 31st, 1912, Serial Number 739,522, I have set forth a device for the same general purpose, comprising a chart element having units of area marked thereon in a definitely related group, the positions of the individual units being determinable by reference to factors of latitudinal and longitudinal location, appropriate to the general arrangement of the group, and having also inscribed thereon a plurality of zone indications progressively arranged with relation to one of said units of area of the central region. The chart described in said application can be made available for any home station which lies within a given latitude belt, the necessary factors corresponding to the longitude belt of said home station being determined and applied by means of independent devices termed "longitude bands".

In the parcel post system as originally devised and published by the United States postal authorities, about 3500 different maps were required to provide for the respective zone relations of the total number of home stations, or selected central regions. Within the area thus comprised there were about 49 different latitude belts and by my former invention, set forth in the application just referred to, only 49 charts were required instead of 3500.

The object of the present invention is to afford a universal chart element adapted not only to all positions of longitude within the United States, but also to all positions of latitude, so that a single chart embodying my present improvements would be available for every home station, or central region, within the conditions of the postal zone delivery.

In the accompanying drawings, I have shown in Figure I, a top or plan view of a chart embodying my present improvements in their simplest or most elementary form. Fig. II, is a partial view of the same, but showing a movable indicating device in a working position. In Figs. III, IV, and V, I have shown a more highly organized form of the device operating upon precisely the same principles, but presenting further features of advantage for manipulation, compactness of assemblage, etc. Fig. III, is a top or plan view of the said device; Fig. IV, is a partial side elevation thereof, and Fig. V, is a transverse section on the line V, V, of Fig. III.

It will be understood that the designations of latitude and longitude employed in this chart, or indeed in the Post Office Regulations, do not necessarily correspond with the ordinary notations of the parallels of meridians, as employed upon maps, indeed any progressive designations of latitude subdivisions or longitude subdivisions could be used, since these are arbitrary, and since the Post Office Directory designates the units of area of any given receiving or delivery station by arbitrary numerals which indicate its position of latitude and longitude with relation to a pre-established enumeration of the group.

In the chart shown in the accompanying drawings, the parallels of latitude and meridians of longitude are represented by straight lines respectively at right angles to one another, the zones being indicated thereon preferably by different shaded areas which may be colored if desired. Furthermore, the limiting lines of the zones instead of being arcs of circles, are preferably indicated in terms of the respective units of area, the edges being stepped, or so to speak, blocked out, a method of representation which avoids uncertainty as to the zone location of points within a unit of area which would be bisected by a true circular arc.

In the drawings it has been necessary to use numerals, in their ordinary signification, and it has been found convenient to employ capital letters in order to denote the latitude and longitude factors since some such notations must be actually marked upon the chart and its adjunctive elements. In the following description I shall therefore employ small letters, either alone or with numerals, to indicate the physical parts of the device, for the purpose of distinction.

Referring to the form shown in Figs. I, and II, $a$, represents a flat board or table upon which is mounted a chart $a'$, divided by vertical and horizontal lines into a number of rectangles, which, in this instance, may be supposed to correspond in theoretical dimensions with the respective units of area established by the Post Office Regulations. These units of area it will be noted lie in both horizontal and vertical belts. The horizontal belts in this instance, are longitude belts, that is to say, any row of units of area comprised between two adjacent horizontal lines, represents a belt of longitude intended to be co-extensive with the requirements of the chart, as hereinafter explained, and any row of units of area lying between two adjacent vertical lines represents a belt of latitude.

Referring now to the extreme left hand lower corner, the group of four cross-hatched rectangles at $b'$, (in the two upper ones of which the letter "z," and numeral 1, are printed), is supposed to indicate the territory immediately adjacent to a home station, or point of shipment in which the lowest postal rate is applied. Immediately outside of this group $b'$, of four rectangles, is what may be considered approximately the quadrant of a zone $b^2$, whose borders or outlines are blocked as above stated, said quadrant being represented as unshaded. Immediately outside of this is another quadrant zone $z^3$, comprising a larger number of units of area, in this instance, cross-hatched. Immediately outside of this quadrant zone is a third quadrant zone $b^4$, represented as unshaded. Beyond this is a fourth quadrant zone $b^5$, represented as cross-hatched. Beyond this is a fifth quadrant zone $b^6$, represented as unshaded. Beyond this is a sixth quadrant zone $b^7$, represented as cross-hatched, and beyond this the area of the chart is comprised in an unshaded portion $b^8$, which is represented as extending to the extreme limits of the chart, this arrangement being due to the fact that all the territory lying beyond zone $b^7$, is comprehended in a uniform rate. Certain letters and numerals are imprinted in the respective zone segments. Thus, in the group $b'$, the letters z, 1, are imprinted, including the first zone in which the minimum rate prevails. In the next quadrant $b^2$, the letters and numerals z, II, 4 + 2 are imprinted, which indicate that it is zone 2, and that the rate is four cents per pound, plus two cents bonus per package. These letters and numerals are however, not an essential part of the system, but are simply indicated as convenient adjuncts in order that the user of the chart may read directly therefrom the rate applicable to the zone distance which he desires to ascertain. The factors can of course, be supplied from any other source when once the zone relation is known, and if desired the information could be printed or the respective zones could be indicated by any arbitrary system of coloring or the like.

At the left hand side of the chart $a'$, and independent thereof, are two parallel bands $c$, and $c'$, respectively, each subdivided by horizontal lines which are prolongations of the horizontal lines upon the chart. In this instance the band $c$ contains a less number of subdivisions than the band $c'$ for a reason which will be hereafter explained. The band $c$ contains at its top the capital letter E (meaning east) and numerals from 1 to 55, both inclusive, inscribed progressively downward in its subdivisions. The band $c'$ contains at its top the letter W (indicating west) and numerals from 55 to 125, both inclusive, inscribed progressively upward in its subdivisions. For purposes of convenience, these bands may be referred to as variable longitude bands, their purpose being to accommodate the chart to any desired longitudinal position within the entire area intended to be covered by the chart. These variable longitude bands, may be appropriately retained in a frame $c^2$, mounted upon the board or table $a$. Said table also is provided with raised tracks $d$, $d'$, running parallel to the vertical lines upon the chart, and adapted to receive runners or slides $d^2$, $d^3$, which support a movable scale piece $d^4$. Said scale piece has a short slot $d^5$, corresponding in location and extent to two laterally adjacent members upon the longitude bands $c$, $c'$. It has also an elongated slot $d^6$, corresponding in dimensions to an entire longitude belt, running horizontally across the chart $a'$. Adjacent to said slot $d^6$, and on opposite sides thereof, are two parallel bands containing subdivisions which correspond in lateral extent with the subdivisions of the latitude bands upon the chart $a'$, the dividing lines upon the bands being in effect prolongations of the vertical lines upon said chart.

For purposes of convenience, the bands upon the scale piece may be termed variable latitude bands, their purpose being to accommodate the chart to any desired latitudinal position of the central point within the entire area intended to be covered by the chart. The markings in the present instance are as follows: Upon the upper band $d^7$ at the right hand extremity of the subdivision is letter N (indicating north) and the subdivisions are arbitrarily designated as follows: Reading from right to left the first subdivision is marked A, the next 1, the next B, the next 2, the next C, the next 1, etc., down to and including the letter P. Upon the lower band $d^8$ there is inscribed at the right hand extremity the capital letter S (indicating south) and the subdivisions, reading from left to right are progressively designated as P, 2, Q, 1, R, 2, etc., down to and including as the last two Z, 2.

This method of notation is adopted because the letters of the alphabet are not sufficient in number to characterize all the subdivisions of the latitude belts, and therefore the numeral immediately following any given letter, is supposed to relate to the duplication of that letter with said added numeral, as, for instance, in the upper band beginning at the right hand end and progressing toward the left, the notations are intended to signify A, A1, B, B2, C, C1, but to economize space I have omitted the reduplication of the capital letter, and in order to avoid confusion, I employ the numerals 1, and 2, alternately, to indicate said duplication.

It has been stated that the chart comprising my present invention is a universal one, and an illustration of this statement will now be given.

It will be noted that the number in each subdivision of the variable longitude bands $c$, and $c'$, opposite to the longitude belt nearest the observer, or at the bottom of the chart, is in each instance 55. This number is supposed to be the number in the Post Office Guide indicative of the longitude position of the home station, for which the chart is to be used. Similarly, it will be noticed that in the variable latitude bands $d^7$, and $d^8$, upon the sliding scale piece $d^4$ the letters immediately opposite to the extreme left hand latitude belt are P, P. This arbitrary letter P, must be considered to correspond to the latitude designation of the home station in the Post Office Guide or Directory. It will be recalled that at the remote end of the variable longitude band $c$, the letter E, is marked, indicating east, and the letter W, to indicate west, is marked at the top of the band $c'$. It will also be recalled that in the variable latitude band carried upon the sliding scale $d^4$, the letter N, is marked, at the right hand extremity of the upper series, and the letter S, at the right hand extremity of the lower series.

If now it is desired to ascertain the zone distance from the selected home station whose longitude is 55 and whose latitude is P to any given point whose latitude and longitude are indicated by notations corresponding respectively to the notations upon the latitude and longitude bands, the sliding scale $d^4$, is moved along its tracks until the longitude numbers visible through the slot $d^5$, correspond to the longitude of the delivery point. If said point lies east of the home station, its longitude designation is noted by reference to the corresponding notation upon the variable longitude band $c$, and vice versa, if it lies to the west of the home station its designation is noted by reference to the corresponding notation upon the variable longitude band $c'$.

Since the tracks $d$, $d'$, coincide in direction with the lines indicating the parallels of latitude, the coördinate position of the divisions upon the scale piece, with relation to the central region, is not affected by the movement of said scale piece.

Longitudinal location of the delivery point having been thus noted, its latitudinal position is then similarly noted by reference to one or the other of the variable latitude bands upon the sliding scale $d^4$. If the latitude is north of the delivery point, the latitudinal position is read by reference to the subdivisions upon the upper band $d^7$. If, on the other hand, it is south, it is read by reference to the subdivisions upon the lower band $d^8$. When the longitudinal and latitudinal position of the delivery point with reference to the home station has been thus ascertained by reading from the appropriate variable longitude band and the appropriate variable latitude band, the zone in which such delivery point lies is visible through the slot at the point of intersection of the coördinates thus afforded, and the observer can then apply the appropriate zone rate.

Upon the chart $a'$, the information as to rate is also stated in connection with the marks indicative of the zone itself. Thus, in the instance shown, in Fig. II, the longitude of the delivery point is either 54 east, or 56 west, of the home station, and if the latitude corresponds to either H, or X, it will be seen at once that the delivery point lies in the fourth zone marked $b^4$.

A convenient method of providing longitude and latitude bands, respectively, is to print the subdividing lines and their respective numerals of a given longitude band or a given latitude band, on both sides of a single strip of paper, the subdividing lines on opposite sides coinciding with one another, but the numerals upon one side being printed upside down with relation to those upon the other side, and being also displaced by one space or subdivision, that is to say, the numeral 55 upon one side of the strip will be opposite to the numeral 54 upon the other side of the strip, and as before stated, the figures themselves will be upside down with relation to one another. This method of printing the longitude bands has already been set forth in my former application, and need not be further described.

I will now proceed to describe the embodiment of my invention shown in Figs. III, IV, and V. The method of preparing or imprinting the chart, with its latitude and longitude bands, is identical with that just described, but instead of being supported upon a plane surface, the chart is mounted upon a rotatable cylinder, carrying upon its axis a drum upon which the longitude bands are carried. In said drawings, $e$, represents an external casing or shell inclosing the cylinder $e'$, mounted upon trunnions $e^2$, and having at one end a hand wheel $e^3$. At the other end a drum $e^4$, is mounted upon the protruding axis $e^2$, of the cylinder. The casing has a longitudinal slot $e^6$, extending across its upper face and adjacent to the edges of said slot are mounted two scale pieces $f$, $f'$, respectively, each of which is adapted to receive a band such as $g$, $g'$, which may be conveniently retained therein by overlapping strips $h$, $h'$. The bands $g$, $g'$, correspond in character and function with the variable longitude bands $d^7$ $d^8$, hereinbefore described, and comprise similar notations. Hence they need not be further described. Upon the drum $e^4$, are mounted two bands $i$, and $i'$, respectively, which may be conveniently secured in position by means of a clamping ring $j$. These bands $i$, $i'$, correspond in character and function with the variable longitude bands $c$, $c'$, hereinbefore described, and are provided with notations such as were set forth in connection with the description of said bands. A slotted projecting piece $k$, whose slot $l$, corresponds in width with the subdivisions upon the longitude bands, extends over the drum in such relation as to permit only two lateral adjacent subdivisions of the longitude bands to be completely visible through the slot at any one time. Said slot $l$, is in direct prolongation of the slot or opening between the scale pieces $h$, $h'$. It will be observed that by turning the hand wheel $e^3$, the chart and the variable longitude bands are rotated with reference to the latitude bands, which is the correlative of the movement described in connection with Figs. I, and II, where the chart was stationary and the latitude bands were moved across it, hence the two devices are identical in principle so far as relates to the ascertainment of relative positions and differ only in the means for manipulation.

It will thus be seen that by the peculiar organization above described, in which permanent longitude belts and latitude belts are inscribed with zones arranged in quadrant relation to one of the subdivisions, in combination with variable longitude bands and variable latitude bands, capable of being read in either direction from the fixed central point, a universal chart is obtained which is adaptable to any home station, or unit of area, within the limits comprised by the entire longitudinal and latitudinal dimensions of the total area of territory.

I am of course aware that the use of devices comprising rectangular coördinates and provided with scales, is not new and I do not broadly claim any such organization.

My invention is definitely related to the peculiar conditions where geographical units of area and the like are represented upon a chart in connection with zones definitely related to one of said units of area as a central point, and the present invention relates broadly to the system wherein, through arranging the zones in quadrant relation to a given point, and providing means for indicating longitude and latitude relations from varying longitudinal and latitudinal positions, of the central point, the chart is rendered universally applicable.

In my specification and claims, I use the words "latitude," and "longitude" and the adjectives corresponding thereto, as convenient terms to describe the respective belts of units of area, and for the purpose for which the invention is primarily intended, the subdivisions are in fact related to divisions of terrestrial latitude and longitude, but it must be understood however, that the said terms are not employed in any restrictive sense, since the subdivisions of the chart and the method of their designation are not necessarily related to actual subdivisions of terrestrial latitude and longitude.

In the foregoing description I have employed as designating symbols upon the longitude and latitude bands, ordinary Arabic numerals in the one case and letters with added numerals in the other. It must be understood that these symbols are only important to the invention in so far as they are recognizable as definitely progressing in what may be called value, with relation to a given starting point, hence I do not limit myself to the employment of any specific system of symbol notation.

For convenience of description, I shall refer to the longitude and latitude bands as two-section scales, in order to indicate the characteristic that the series of symbols upon each is adapted to be divided in the manner above described.

Having thus described my invention, I claim:

1. The combination of a chart element, comprising a geographical area laid out in units arranged in latitude and longitude belts and also comprising a plurality of indicated zone quadrants progressively arranged with relation to one of said units of area as a central region; of a two-section scale, independent of the chart element, and having subdivisions which correspond to the latitude subdivisions upon the chart, said subdivisions being respectively indicated by progressive symbols upon each section but diminishing in value upon one section and increasing in value upon the other section from a starting symbol common to both; and a two-section scale independent of the chart element, having subdivisions which correspond to the longitude subdivisions upon the chart, said subdivisions being respectively indicated by progressive symbols upon each section, but diminishing in value upon one section and increasing in value upon the other section from a starting point common to both.

2. The combination of a chart element, comprising a geographical area laid out in units arranged in latitude and longitude belts and also comprising a plurality of indicated zone quadrants progressively arranged with relation to one of said units of area as a central region; of a two-section scale, independent of the chart element, and having subdivisions which correspond to the latitude subdivisions upon the chart, said subdivisions being respectively indicated by progressive symbols upon each section, but diminishing in value upon one section and increasing in value upon the other section from a starting point common to both; and a two-section scale independent of the chart element, and having subdivisions which correspond to the longitude subdivisions upon the chart, said subdivisions being respectively indicated by progressive symbols upon each section, but diminishing in value upon one section and increasing in value upon the other section from a starting numeral common to both; and means for movably supporting one of said two-section scales to move in a definite path parallel to the appropriate belt upon the chart element; whereby said movable scale may be shifted to bring its symbols into immediate juxtaposition with different points of the respective zones, while maintaining its own coordinate relation to the zone center.

3. The combination of a chart element mounted upon a rotatable cylinder, said chart comprising a geographical area laid out in units arranged in latitude and longitude belts and also comprising a plurality of indicated zone quadrants progressively arranged with relation to one of said units of area as a central region; of a two-section scale, independent of the chart element, and having subdivisions which correspond to the latitude subdivisions upon the chart, said subdivisions being respectively indicated by progressive symbols upon each section but diminishing in value upon one section and increasing in value upon the other section from a starting point common to both; a two-section scale, independent of the chart element, and having subdivisions which correspond to the longitude subdivisions upon the chart said subdivisions being respectively indicated by progressive symbols upon each section but diminishing in value upon one section and increasing in value upon the other section from a starting point common to both; a rotatable drum carried co-axially by said cylinder; and a stationary elongated member arranged parallel to the axis of said cylinder; one of said two-section scales being mounted upon said drum and the other being mounted upon said stationary member.

In testimony whereof, I have hereunto signed my name at Philadelphia, Pennsylvania, this fourteenth day of March, 1913.

WILLIAM B. OLIVER.

Witnesses:
JAMES H. BELL,
E. L. FULLERTON.